US007249795B1

(12) United States Patent
Kellerman

(10) Patent No.: US 7,249,795 B1
(45) Date of Patent: Jul. 31, 2007

(54) FLAG STORAGE COMPARTMENT IN A HEARSE

(75) Inventor: Michael R. Kellerman, Cincinnati, OH (US)

(73) Assignee: Eagle Specialty Vehicles, LLC, Amelia, OH (US)

( * ) Notice: Subject to any disclaimer, the term of this patent is extended or adjusted under 35 U.S.C. 154(b) by 0 days.

(21) Appl. No.: 11/527,807

(22) Filed: Sep. 27, 2006

Related U.S. Application Data

(60) Provisional application No. 60/721,867, filed on Sep. 28, 2005.

(51) Int. Cl.
*A61G 21/00* (2006.01)
*B60R 7/02* (2006.01)
*B60R 7/08* (2006.01)

(52) U.S. Cl. ...................... 296/37.1; 296/16; 296/37.8; 296/37.16

(58) Field of Classification Search .................. 296/16, 296/37.1, 37.8, 37.13, 37.16, 149, 152, 191; 224/282, 539, 542, 543; 40/581
See application file for complete search history.

(56) References Cited

U.S. PATENT DOCUMENTS 1,589,230 A * 6/1926 Roedding .................. 224/282
1,694,855 A * 12/1928 Irons ...................... 296/37.13
2,138,647 A * 11/1938 Schofield ............... 248/222.14
2,347,002 A * 4/1944 Schofield ..................... 296/16
2,585,046 A * 2/1952 Schofield ..................... 296/17
2,666,666 A * 1/1954 Schneider et al. ............ 296/16
2,710,769 A * 6/1955 Rosenthal .................... 296/17
3,038,629 A * 6/1962 Morton ....................... 220/477
3,147,788 A * 9/1964 Pinnola ...................... 150/110
4,537,438 A * 8/1985 Reasor et al. ................. 296/17
4,750,774 A * 6/1988 Pickering ................. 296/37.13
5,702,144 A * 12/1997 Matsuura et al. ........ 296/37.13
5,795,005 A * 8/1998 Garfias et al. ............. 296/37.5
5,855,310 A * 1/1999 Van Ert et al. ............. 224/543
5,951,085 A * 9/1999 Fukatsu ..................... 296/37.8
6,003,926 A * 12/1999 Labeur ...................... 296/37.8
6,073,766 A * 6/2000 Winnard ..................... 206/350
6,439,634 B1 * 8/2002 Jensen et al. .............. 296/37.6
6,502,885 B1 * 1/2003 Gammon et al. ........ 296/37.13
6,637,795 B2 * 10/2003 Jonardi et al. ........... 296/37.13
6,732,895 B2 * 5/2004 Poliquin et al. ............ 224/543
6,880,874 B1 * 4/2005 Kallenberger et al. ... 296/37.13

* cited by examiner

*Primary Examiner*—D. Glenn Dayoan
*Assistant Examiner*—Greg Blankenship
(74) *Attorney, Agent, or Firm*—Neal O. Willmann

(57) ABSTRACT

Disclosed herein is a compartment conveniently situated in the rear compartment of a hearse for storing the flags that are frequently magnetically attached to the roofs of vehicles in a funeral procession. Vehicles displaying these flags are typically accorded certain traffic privileges, and occasionally, bystander respect, as the procession wends its way from the funeral service to the gravesite. The disclosed compartment necessarily has a door compatible and continuous with the paneling of the rear transport area, a pivoting tray pivotally attached to the floor of the compartment and a magnetized transport tray sized to fit on the pivoting tray and easily removed to facilitate the distribution of the magnetized flags.

6 Claims, 2 Drawing Sheets

FLAG STORAGE COMPARTMENT IN A HEARSE

CROSS-REFERENCE TO RELATED APPLICATION

This application claims the benefit of the filing date of U.S. Provisional Patent Application No. 60/721,867 filed Sep. 28, 2005.

BACKGROUND OF THE INVENTION

This disclosure relates generally to a means for storing flags that are used to identify vehicles that are part of a funeral procession. Typically, funeral flags have magnetic base elements that facilitate the attachment of the flags to the roofs of vehicles in the funeral procession. The flags are distributed during and/or after the funeral service and collected from the roofs of the vehicles parked at the mausoleum or gravesite. It is the goal and purpose of this disclosure to provide a convenient location for storing funeral flags in a designated compartment in a hearse or funeral coach where they can readily be found and accessed.

DESCRIPTION OF THE PRIOR ART

There is nothing novel or inventive about flags, vehicles and the storage of those flags within a vehicle. Typical of the patent art is U.S. Pat. No. 4,574,726, which issued to Sullivan on Mar. 11, 1986. The Sullivan document describes a portable, temporary, emergency distress signal capable of being collapsed and carried in the dash compartment of an automobile. The flag comprises a telescopable rod-type staff, a magnet base and a fabric flag. Nothing in the Sullivan reference describes the inventive features of the disclosed flag-storing compartment.

U.S. Pat. No. 4,633,215, which issued to Anders et al. on Dec. 30, 1986, describes a battery powered help-summoning device, which can be compactly stored within the vehicle, and then quickly assembled and deployed by an occupant of a vehicle, from the security of the vehicle. Nothing in the Anders et al. reference suggests a compartment for the storage of a plurality of flags, which are to be distributed for attachment to the roofs of other automobiles.

And, U.S. Pat. No. 4,977,849, which issued to Brinton on Dec. 18, 1990, describes a self-opening and closing distress flag that is apparently self-storing by reverse-telescoping into a trunk or wheel-well compartment, but no mention is made of the need or capability of storing multiple flags in an unapparent compartment within the vehicle.

SUMMARY OF THE DISCLOSURE

The disclosed invention is a compartment discreetly positioned in the paneling of a hearse or funeral coach for the storage of magnetized flags used to distinguish or to identify the members of a funeral procession. The compartment is typically positioned in the paneling of the rear compartment of the funeral coach and necessarily comprises the following features: The compartment consists essentially of a floored void positioned in the paneling of the funeral coach. The compartment has a door having an outer surface compatible and continuous with the paneling of the rear transport area of the coach. Positioned within the compartment is a pivoting tray situated perpendicularly to the lower inner surface of the door and pivotally attached to the compartment floor, said tray having an upper surface for positioning a transport tray having a ferromagnetic component for attracting and stabilizing the magnetized funeral flags.

DESCRIPTION OF THE PREFERRED EMBODIMENT

Figure 1:
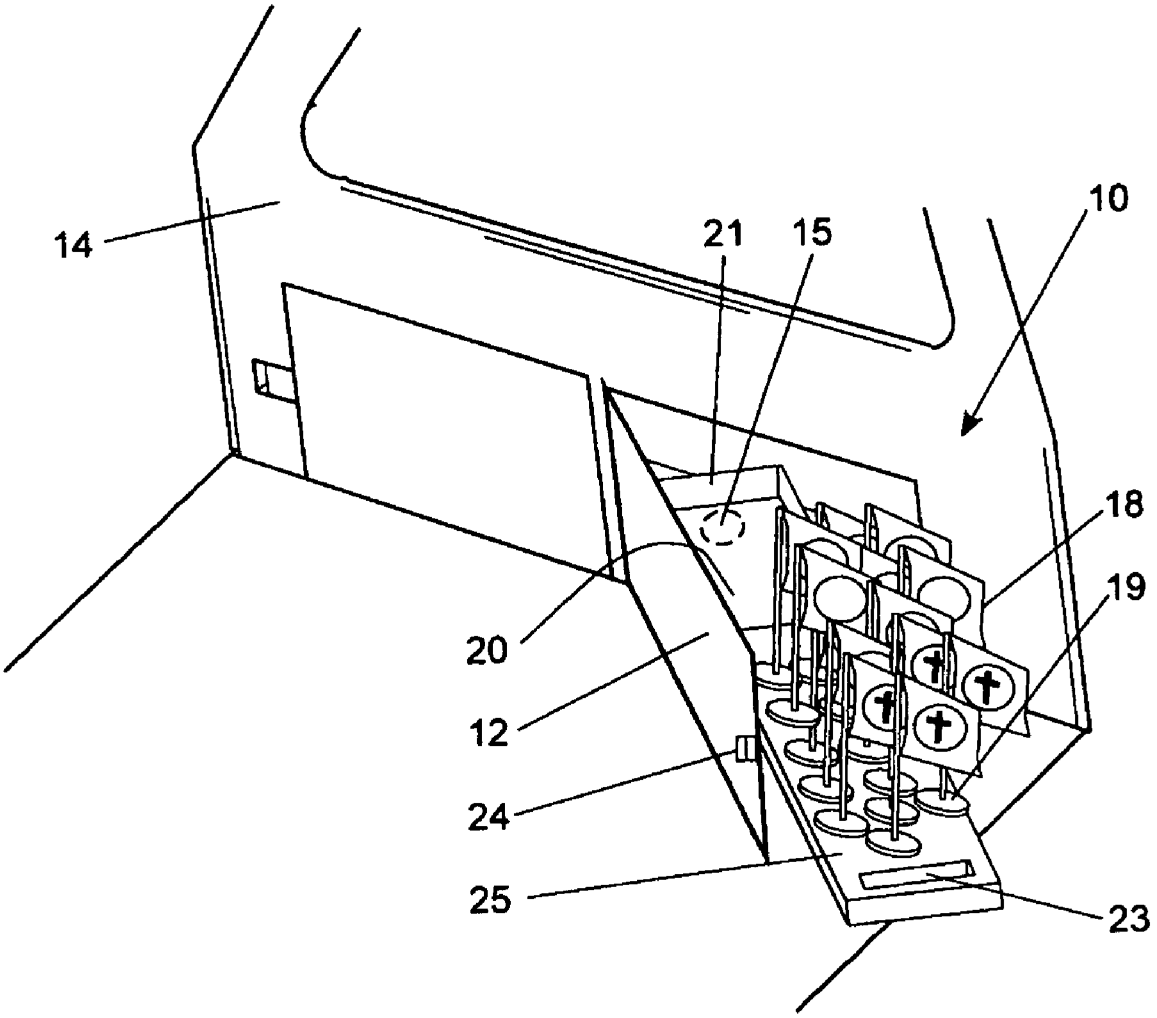
FIG. 1 is an isometric view of the rear transport area of a funeral coach compartments in a wall panel of the coach for storing funeral flags.

The disclosed flag storage compartment 10 can be fully understood and appreciated by referring to the drawing. FIG. 1 is an isometric view of the rear compartment of a funeral coach or hearse illustrating a pair of compartments 10, one closed and one open. The compartment(s) 10 can be installed in any paneling of the rear compartment of the hearse, but for convenience and ease of access, it is currently preferred to install the compartment 10 in the wall panel 14 separating the rear transport area from the driver's area. The compartment 10 consists essentially of a void having a floor 11 and a door 12 having an outer surface that is preferably hinged to the wall paneling of the hearse, and compatible and continuous with the paneling. Compatible and continuous means that the outer surface of the door is typically made of the same material as the interior paneling of the rear compartment to aesthetically blend with the décor of the hearse. The door will typically have a handle and latch assembly 24 to secure the door in a closed position and to facilitate opening it.

Also apparent in FIG. 1 is the presentation of the funeral flags 18. The flags 18 are necessarily fitted with magnetic bases 19 to permit attachment to the roofs of automobiles in the procession. When stored according to the disclosed invention, the flags are placed on a transport tray 25, which has a ferromagnetic feature to attract the magnetic bases 19 of the flags to hold them in place when stored.

The transport tray 25 is intended to be easily removed from the compartment 10 and hand-held while the flags are being distributed and attached to the roofs of the autos in the procession. For convenience, the transport tray 25 can be fitted with a handle 23 for grasping while being removed from the compartment.

In storage, the flags are magnetically attached to the transport tray 25, and the transport tray is positioned on a pivoting tray 20, which is attached to the floor 11 of the compartment 10 by a pivoting means 15, such as a perpendicular pin or bolt, which supports the tray 20 within the compartment 10 and allows the tray 20 to pivot, or swing, out of the compartment to present the flags for distribution and use.

Figure 2:
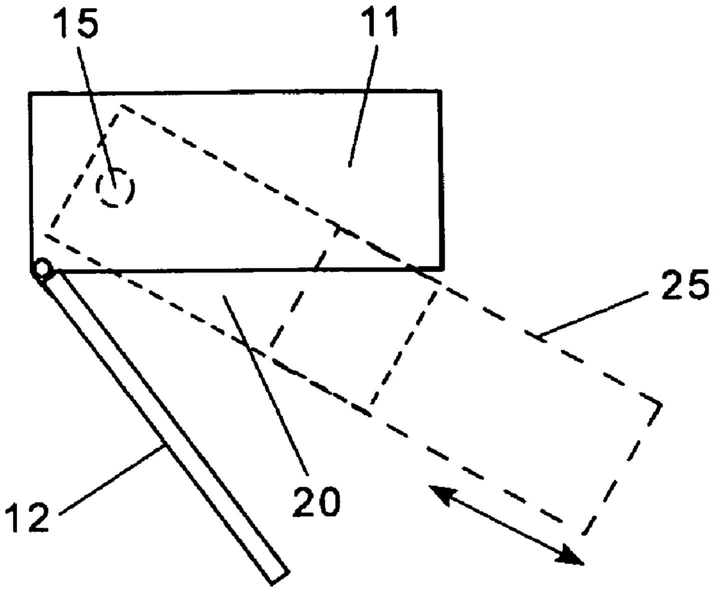
FIG. 2 is top plan schematic view of the disclosed storage compartment illustrating the components and features of the compartment.

FIG. 2 is a schematic depiction of the disclosed compartment 10 illustrating the pivoting movement of the pivoting tray 20 with the removal of the transport tray 25. To facilitate the removal of the transport tray from the compartment, the transport tray is, as mentioned, fitted with a handle 23, and the top surface of the pivoting tray 20 is preferably fitted with a flange 21 along at least half the perimeter of the upper edge of the tray 20. The flange 21, perpendicular to the upper surface of the tray 20, functions to hold the transport tray in place during storage and to guide the removal of the transport tray 25 from the compartment 10. The upper surface of the pivoting tray can also be coated or covered with a material to assist in the sliding removal of the transport tray 25, and currently a simple fabric covering is more than sufficient.

Figure 3:
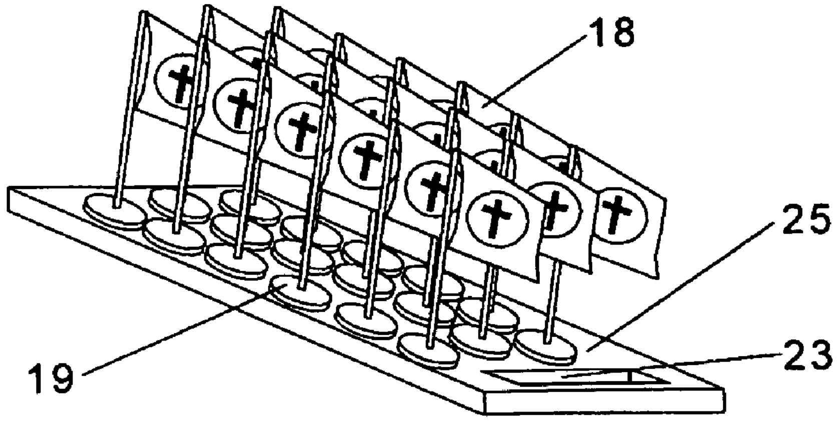
FIG. 3 is a perspective view of one component of the disclosed compartment, the transport tray with flags attached.

The complete removal of the transport tray 25 is illustrated by FIG. 3. And, to repeat, the tray is easily hand-held for the distribution of flags and capable of attracting the magnetic bases 19 of the flags 16.

While the foregoing is a detailed and complete description of the preferred embodiments of the disclosed flag storing compartment, it should be apparent that numerous variations and modifications can be made and employed to implement the all important purpose of the disclosed apparatus without departing from the spirit of the invention, which is fairly defined by the appended claims.

The invention claimed is:

1. A compartment consisting essentially of a floored void positioned in a wall panel of a rear transport area of a hearse for the storage of magnetized funeral flags, said compartment comprising:

a door having an outer surface compatible and continuous with paneling of said rear transport area;

a pivoting tray positioned perpendicularly to a lower inner surface of said door and pivotally attached to said compartment floor, said tray having an upper surface; and, a transport tray sized for placement on the upper surface of said pivoting tray and having a ferromagnetic component for attracting and stabilizing said magnetized funeral flags.

2. The compartment according to claim 1 wherein the door has a handle to facilitate opening said compartment.

3. The compartment according to claim 1 wherein the door is hinged to the wall panel of the hearse.

4. The compartment according to claim 1 wherein the pivoting tray has a plurality of perimeter flanges perpendicular to said upper surface.

5. The compartment according to claim 4 wherein the transport tray is generally held in place by said flanges.

6. The compartment according to claim 1 wherein the transport tray has a handle for grasping.

* * * * *